Dec. 24, 1935.      P. H. KECK      2,025,516
AUTOMATIC RACKING MACHINE
Filed March 1, 1933      2 Sheets-Sheet 2
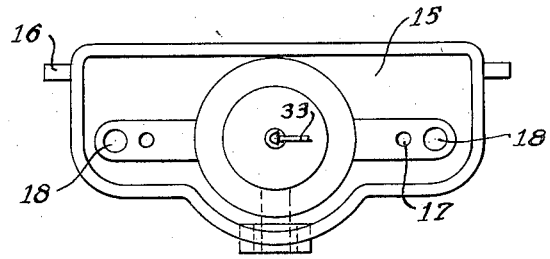
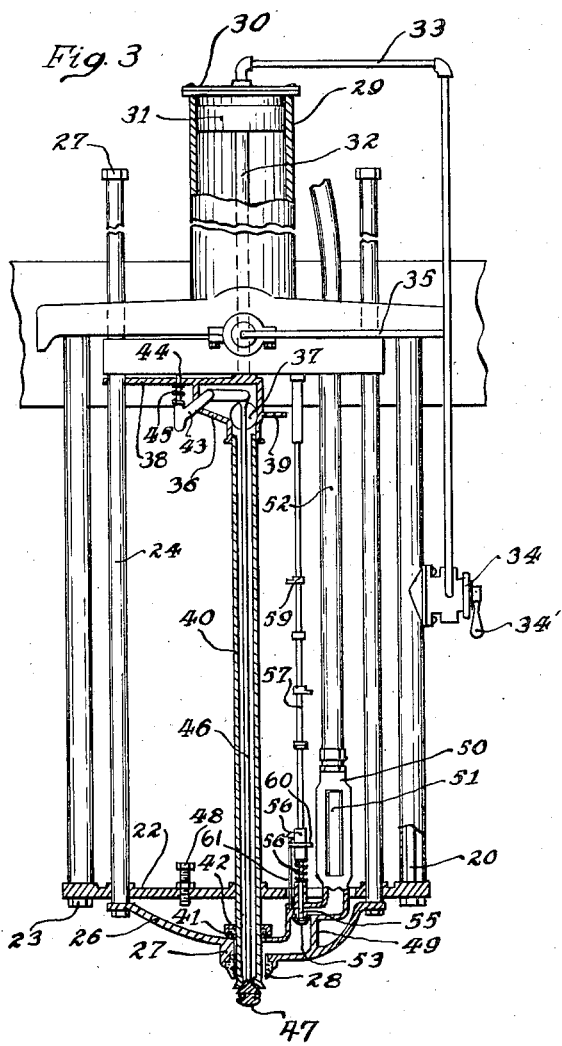
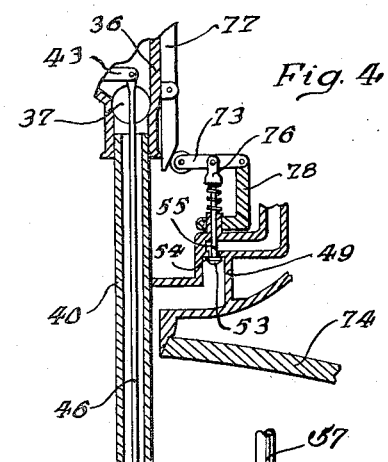
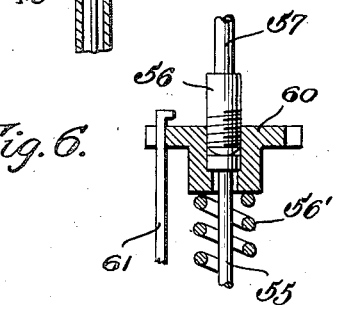
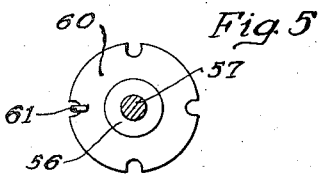
Inventor
Paul H. Keck
By John F Brezina
atty.

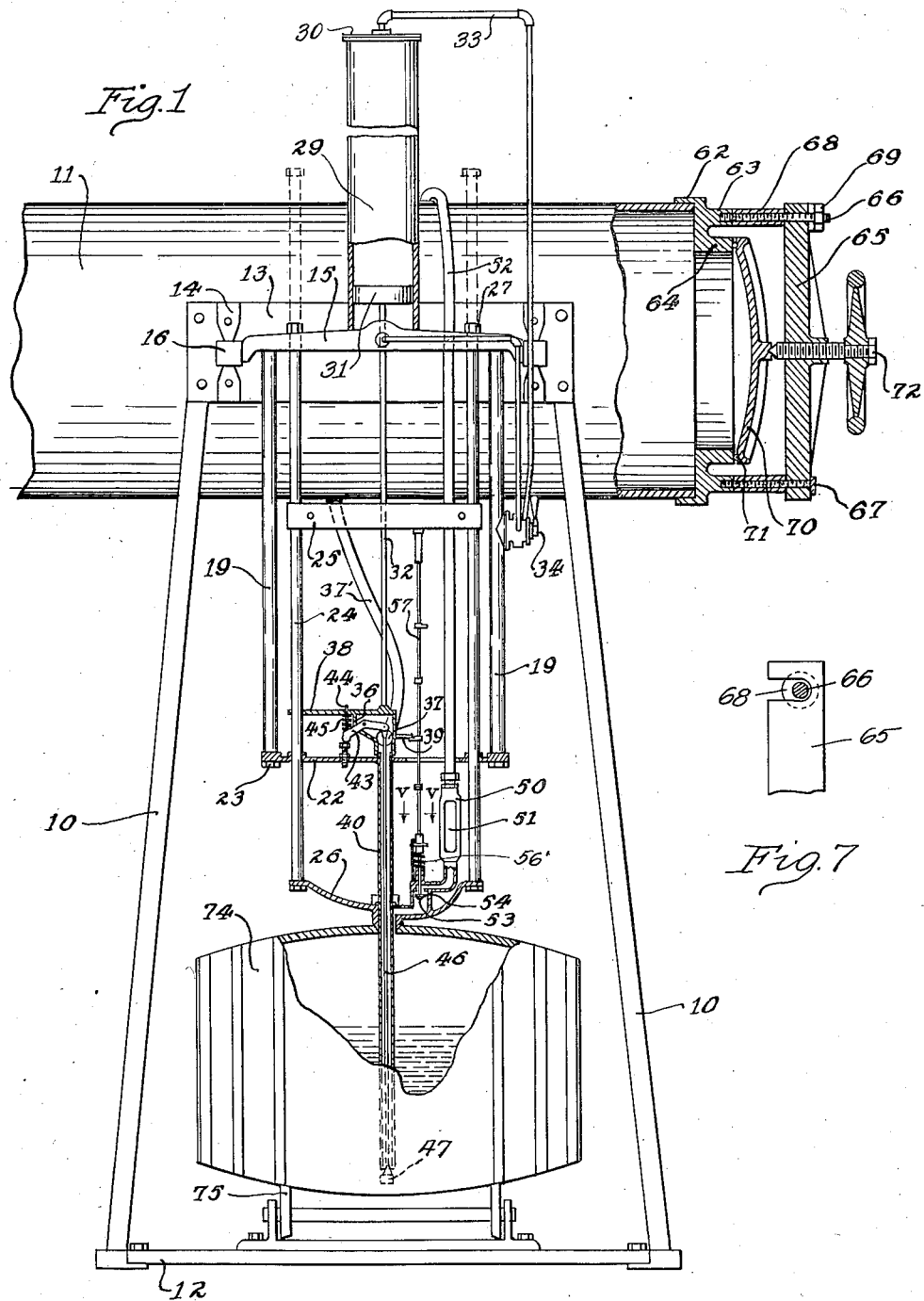

Patented Dec. 24, 1935

2,025,516

UNITED STATES PATENT OFFICE 2,025,516

AUTOMATIC RACKING MACHINE

Paul H. Keck, Chicago, Ill., assignor to Richard Wassermann and Louis Monninger

Application March 1, 1933, Serial No. 659,125

6 Claims. (Cl. 226—110)

This invention relates to an automatic machine for filling kegs or other containers and is particularly directed to a slidably mounted liquid receiving and keg filling tube adapted to be lowered into the keg by manually controlled air operated mechanisms more specifically hereinafter described, and is further directed to a novel construction and means which will indicate when the keg is full and will permit return flow back into the liquid reservoir without spillage of any of the liquid. Further novel features of the construction of my automatic machine will be clearly set forth in the following objects and more specifically described in the following specifications.

An important object of my invention is the provision of an automatic keg filling machine of the type wherein air pressure is used above the liquid in the reservoir and having one or more swingable mounting frames so pivoted that when one filling operation is completed the frame and connected parts will swing of their own weight arcuately and out of the way, permitting convenient access to the keg and convenient placement of the bung or other stopper, and which, when the filling operation is to be repeated, may be quickly and easily swung into filling position after an empty container has replaced the one previously filled.

A further object of my invention is the provision of an automatic keg filling machine having a swingable frame, a slidable frame slidably mounted with respect to said swingable frame, a slidably mounted filling tube communicating with the liquid reservoir and a liquid return system comprising a housing and return line, one end of which is snugly inserted in the keg aperture whereby when the keg is filled the liquid will pass through said return line back into the reservoir, and an automatically and adjustably controlled valve means in said return line for the purposes hereinafter set forth.

A further object of my invention is the provision of a liquid reservoir adapted particularly for use in connection with receptacle filling machines, and having its opposite ends conveniently removable, and having manually operable screw means mounted at the ends of each reservoir whereby the ends or cover may be held with uniform tightness in sealing engagement against the end of the reservoir.

Other and further important objects of this invention will be apparent from the disclosures in the specification and the accompanying drawings.

This invention (in a preferred form) is illustrated in the drawings and hereinafter more fully described.

On the drawings:

Fig. 1 is a front elevational view, with parts broken away, of my automatic racking machine.

Fig. 2 is a top plan view of the mounting bracket with respect to which each arm or unit of the machine is mounted.

Fig. 3 is an elevational and partially cross sectional view of the racks or frames and the automatic and air controlled mechanism, and showing the relative position of the parts in inoperative position.

Fig. 4 is a fragmentary and cross sectional view of a slightly modified form of a valve mechanism and housing therefor which forms a part of the return line to the reservoir.

Fig. 5 is a cross sectional view of an indicator wheel taken on line V—V of Fig. 1, and which forms a part of the manually controlled mechanism for adjusting the back pressure valve with respect to containers of different size.

Fig. 6 is a fragmentary view of a portion of my machine showing the swivel construction of the adjustable return valve closing means.

Fig. 7 is a small fragmentary view showing the upper part of the cross beam 65 and illustrating the bifurcation and its engagement with releasable means, with the releasable nut removed.

As shown on the drawings:

Referring to Fig. 1, the reference numeral 10 indicates a plurality of standards, only two of which are shown in the drawings, said standards being adapted to support a liquid tank or reservoir 11 and the keg filling machine hereafter described.

A lower cross beam 12 connects the lower ends of the standards 10 by means of suitable bolts as shown. A mounting plate 13 connects the upper and adjacent standards 10 and normally lies adjacent the walls of the tank 11 as indicated. I desire that it be understood that the automatic keg filling machine which I describe in this preferred form is merely illustrative and of a single unit type, it being understood that a plurality of units may be constructed adjacent to and with respect to a single tank so that any number of kegs or other liquid containers may be filled at the same time.

Secured on the mounting plate 13 and adjacent the opposite ends thereof is a pair of horizontally extending mounting brackets 14 adapted to provide mounting means for a mounting bracket or plate 15 illustrated in top plan view of Fig. 2. The mounting bracket 15 has a stud 16 formed integral therewith and projecting from each end thereof at a point adjacent the corner and off-center with respect to the longitudinal center of the bracket 15, for a purpose which will be set forth in detail hereafter. The respective studs 16 are journalled in the brackets 14 for pivotal movement of bracket plate 15.

The bracket 15 has a raised annular central portion providing for the convenient mounting of a cylinder hereafter described and has a central aperture through which a slidable piston rod of the air operating means is adapted to reciprocate. A pair of apertures 17 are formed on diametrically opposed sides of the central aperture of the bracket plate 15. Adjacent each of the apertures 17 are larger apertures 18 in which are secured the upper ends of a rack or frame which will now be described. The outer rack or frame, which is swingable, comprises a pair of downwardly extending pipes 19 and long threaded rods 20 extending therethrough, the said rods being contained within said pipes 19 and the upper ends of said rods threadingly engaging the respective apertures 18 in the bracket plate 15, and the lower ends of said rods threadingly engaging a connecting cross member 22, said cross member being additionally secured to said rods 20 and against the pipes 19 by nuts 23.

The inner slidable frame of my mechanism comprises a pair of relatively long rods 24 which slide respectively in the apertures 17 of the bracket plate 15, the upper ends thereof being connected together by a suitable connecting member 25 secured thereon, and the lower ends thereof being connected together by a downwardly arched connecting member 26, the apertured ends of which member are bolted to the ends of said rods 24 by suitable nuts, as indicated in Fig. 1. The upper ends of the rods 24 have nuts 27' threaded thereon which act as stops which are adapted to contact the upper surface of the bracket 15 to limit the downward movement of the slidable frame. Each of the rods 24 also slidably engages a suitable aperture in the connecting member 22 at points adjacent the respective pipes 19, as clearly indicated in Fig. 1.

The center of the arched connecting member 26 is formed with a relatively large vertical aperture therethrough, the outer surface thereof terminating in a downwardly extending annular lip or nozzle 27 which has an inner annular dovetailed recess therein for the convenient and releasable mounting therein of a downwardly tapering flexible sealing gasket 28, as indicated in Fig. 1. The construction of the annular lip 27 and sealing gasket 28 permits the convenient and tight fitting insertion thereof into a keg aperture or bung hole.

As indicated in Fig. 1, a metal cylinder 29 is mounted in upright position with its end in sealing engagement against the upper surface of the bracket plate 15, the upper end of said cylinder being sealed by a suitable metal apertured cover 30. Slidably mounted within said cylinder is a piston 31 having a central downwardly extending piston rod 32 which is in slidable and sealing engagement with the aperture in the center of the bracket plate 15 and extends a short distance downwardly where it is attached to a liquid receiving housing which will be described. Air pipe 33 communicates with the aperture in the top cover 30 of cylinder 29 and has its lower end secured in the housing of a manually operable air valve 34 and forms a part of a manually controlled air operated means to effect selective reciprocation of piston 31 and piston rod 32. A pipe 35 connects the lower end of said cylinder 29 with the housing of the valve 34 so that air may be admitted to the lower end of the cylinder to raise the piston 31 when it is desired to lift the apparatus carried thereby.

The valve 34 has a manually operable handle 34' and its interior construction is of the four-way valve type so that the valve may be moved to either a position wherein air will be admitted through pipe 33 into the top of the cylinder 29, or in another position, to be admitted into the bottom of cylinder 29 to raise the piston and attached parts.

A relatively small metal housing 36 as shown in cross section in Fig. 1, has its upper integral boss connected to the lower end of the piston rod 32, said housing 36 having an inlet opening 37 which is connected with an outlet (not shown) on the tank 11 by means of a loose flexible hose 37' so that the liquid from within the tank may flow therethrough and into said housing. The housing 36 has the upper wall thereof extended horizontally to form a projection 38, the end of which projection is apertured for sliding engagement upon one of the rods 24. The side wall opposite said projection has also formed integral therewith a horizontally extending projection 39 which is adapted to engage valve operating means which will be described hereinafter. An outlet opening is formed in the lower part of the liquid receiving housing 36, in which is threadingly secured the upper end of a metal filling tube 40, the lower end of said tube being slidable in the normally vertical opening of the downwardly arched connecting member 26. An annular and relatively tight seal 41 is maintained by a threaded cap 42 between the walls of said filling tube 40 and the annular periphery of said member 26, this being to prevent any passage of liquid therebetween when a container has been filled.

An angular obtuse angled lever 43 is pivoted intermediate its ends in a suitable aperture of a stuffing box secured (not shown) within the liquid receiving housing wall, one end of said lever extending exteriorly and the other end interiorly of said housing. Above the outer end of the lever 43 is secured a downwardly extending pin 44, said pin 44 having thereabout a spiral spring 45, the lower end of said spring being adapted to normally press the outer end of said lever 43 downwardly to maintain the filling tube valve in closed position. A metal connecting rod 46 having one end pivoted to the end of the lever 43 within the housing 36 has its lower end secured in a cone shaped valve 47 which is adapted to seat in the lower and outlet end of the filling tube to close the same. It will be apparent that the spring 45, because of its normal downward pressure, will normally hold the valve 47 in closed position. An adjustable set screw 48 is threaded in the connecting member 22 at a point where it will be engaged by the outer end of the lever 43 when the slidable frame is lowered to cause movement of the said lever against the tension of the spring 45 to cause opening of the valve 47. Said set screw 48 thereby effects an earlier or later closing as desired by the operator, so that the entry of beer into the keg being filled will not begin until the exact time desired and to coincide with the seating of the slidable frame apparatus in the keg bung hole.

Formed integral with one side of the downwardly arched connecting member 26 is a valve housing 49 having a right angled outlet portion opening upwardly. The upper and outlet end of the housing 49 has threaded thereon the lower end of the observing glass housing 50 which houses an observing glass 51. A return pipe 52 connects the upper end of said observing glass housing 50 and the upper portion of the tank 11. It will be noted that the aperture in the downwardly extending annular lip 27 and bushing 28 is sufficiently large so that a passageway remains between them and the filling tube walls so that liquid may enter the valve housing 49 and the return line, as described. The valve 53, preferably of the mushroom type and having a suitable rubber gasket 54 and an upwardly extending stem 55, is slidable in an elongated vertical aperture formed in an upwardly extending portion of the valve housing 49, said gasket being adapted to seat upon an annular shoulder formed by inwardly projecting integral portions of the valve housing walls, as clearly indicated in Fig. 1. The valve stem 55 extends a short distance upwardly and exteriorly of said housing and has secured thereon the lower portion of a rotatable swivel connection 56, a spiral spring 56' being interposed between said swivel connection and the projecting portion of the valve housing and adapted to normally hold said valve in closed position. Secured on the upper portion of said swivel connection is a circumferential indicator wheel 60 having a plurality of peripheral notches, as clearly shown in Fig. 5, said notches being arranged in spaced apart position to correspond with the horizontally extending arms 59 on the rod 57, as hereinbefore described. A yieldable spring arm 61 has its lower end secured in the wall of the valve housing 49, as clearly indicated in Fig. 3, and its upper end is adapted to yieldably and selectively engage one of the peripheral grooves of the wheel 60 to maintain the rod 57 with one of the arms 59 in a position to be engaged by the projection 39 on the liquid receiving housing 36. The upper portion of the swivel connection 56 is shown in Fig. 5 of the drawings, and has secured in its central aperture the lower end of a rotatable rod 57 which has its upper end journalled in a suitable sleeve 58 for rotatable and longitudinal slidable engagement. A plurality of horizontally extending arms 59 are secured in spaced apart relation along said rod 57 and in positions so that each of said arms extend horizontally in a different direction. The respective arms 59 are secured at such points so as to provide for opening of the valve 53 at different relative locations of the slidable frame hereinbefore described, namely in filling large kegs the slidable frame will be lowered a relatively short distance so that descent of the liquid receiving housing and filling tube will effect engagement of the housing projection 39 upon the lowermost arm, whereas in filling a small keg of quarter or one-eighth barrel size the indicator wheel 50 and rod 57 will be rotated so that arm 59 at the desired level will point in a direction to be engaged by the housing projection 59 to cause opening of the return valve 53.

An important and novel feature of my invention consists in the tank end connection which I will now describe and a preferred form of which I have illustrated in the drawings. Because it is frequently necessary to gain access to the inside of the reservoir or tank 11, heretofore the ends have been releasably secured by a plurality of nuts or other means which, because of the nonuniformity of pressure along the annular periphery of the cover plate, has proved unsatisfactory. In my preferred form an annular ring or collar member 62 is adapted to be secured by welding or the like so that the horizontally extending flange thereof fits tightly about the end of the tank. An outer flange 63 and an inner flange 64 are formed integral with said collar member and are spaced a short distance apart as indicated in the drawings and extend in a horizontal direction away from the tank. A cross beam 65 having a relatively large central aperture and a bolt aperture at its lower end, and its upper end having a transversely opening recess or slot which slips about the bolt 66 when beam 65 is rotated. The beam 65 is secured in the relative and rotatable position indicated in Fig. 1 by means of a pivot bolt 67 which threadingly engages the outer flange 63, a spacer 68 being interposed between said flange and said cross beam. The bolt 66 extends through the spacer 68 and has one end threadingly engaged in flange 63, its outer end having a release nut 69 which may be manually released to permit disengagement of the upper bifurcated end of the beam 65 from the bolt 66, permitting said beam 65 to be swung downwardly about its pivot bolt 67. The periphery of a metal cover 70, preferably arcuate in cross section and carrying an annular gasket 71, is adapted to tightly seat against the inner flange 64, as indicated in Fig. 1, said cover having a central conical recess which is engaged by the inner conical end of a hand screw 72 which is threaded in the threaded aperture of the cross beam 65, a hand wheel 73 providing convenient means for manually rotating the screw 72 to cause the cover 70 to bear against flange 64 with uniform pressure along its entire edge.

I will now describe the operation as follows, the inoperative position of my machine being indicated in Fig. 3, the complete arm or filling unit being held by gravity in an inclined position due to the novel construction of the bracket plate 15, as hereinbefore described, thereby being out of the way of a worker placing or removing keg 74 upon a tiltable rack 75. After a keg has been placed upon the rack the operator first pulls the filling unit into a vertical position and permits descent of the slidable rack or frame until the gasket 28 fits tightly in the keg hole, the lower end of the filling tube 40 thereby being within the keg. The operator thereupon operates the air control valve 34 to admit sufficient air into the top of the cylinder 29 to cause downward movement of the piston 31, to in turn cause descent of the liquid receiving housing 36 and filling tube 40 until the lower end of the filling tube contacts the bottom of the keg. During such downward travel the projection 39 on the housing 36 will contact one of the arms 59 to open the valve 53 against the action of the spring 56'. By such movement of said filling tube to its lower limit the valve 47 in the lower end of the filling tube is opened by lever means hereinbefore described and air pressure in the upper part of the tank and above the liquid, forcing the same rapidly into the keg. During such inflow the air from the keg will pass upwardly through the annular space between nozzle 27 and said filling tube 40 and into and through the opening in the valve housing 49 and through the observing glass 51 back into the tank. In the use of my machine in the filling of beer and during such air passage, foam will be maintained in the observation glass 51. When the foregoing filling operation has continued until the keg is full the aforesaid pressure behind the liquid entering the barrel will likewise force the surplus liquid up into the valve housing 49 through the opening valve through the observation glass and into the tube 52. When such return flow begins it will be clearly visible to the operator and he will thereupon operate the valve lever 34' to cause air to be admitted into the bottom of the cylinder 39 to raise the slidable frame and attached parts together with the filling tube, and immediately after such elevation is begun and the lever 43 disengages the said screw 48, the lever 43 will cause immediate closing of the valve 47, and at the same time the spring 56' will raise the rod 57 and connected valve stem to close the valve 53 to thereby prevent any downward flow of liquid from the return pipe 52. Upon elevation of the apparatus to the inoperative position shown in Fig. 3, the operator may conveniently insert the bung into the keg opening and conveniently remove the keg, replace it with another keg, and repeat the aforesaid operation.

A modified form of mechanism for closing the return line valve 53 is indicated in Fig. 4, the valve 53 in this form being of the same construction as hereinbefore described. An L-shaped support 78 is suitably secured about the upper projecting portion of the valve housing 49, the upper end thereof being apertured and the lever 73 having one end pivoted thereto. A cap 76 has its upper end pivoted to lever 73 at a point intermediate the ends of said lever, and its lower end mounted about the upper end of the valve stem 55. The free end of the lever 73 has a relatively small roller rotatably mounted thereon which is adapted to be engaged by the beveled end and edge of a track member 77 secured in vertical position along the sides of the liquid receiving housing 36. It will be apparent that as the liquid receiving housing 36 descends the beveled end of said rack member 77 will cause downward movement of the lever 73 to depress the spring 56' to open said return valve at the desired time.

I am aware that many changes may be made and numerous details of the invention and construction thereof may be varied through a wide range without departing from the principles of this invention, and I therefore do not desire to limit the patent granted thereon otherwise than necessitated by the prior art.

I claim as my invention:

1. In an automatic barrel filling machine, a plurality of standards; a liquid tank having removable ends; a supporting bracket having opposed studs formed integral therewith and in non-alignment with the central longitudinal axis of said bracket, said studs being pivotally secured with respect to said tank; a cylinder mounted on said bracket; a system of air pipes communicating with the ends of said cylinder; a piston slidable in said cylinder; a piston rod on said piston extending downwardly exteriorly of said cylinder; a frame slidably mounted in said bracket and vertically movable; a liquid receiving housing slidably mounted with respect to said slidable frame and movable vertically; an elongated filling tube communicating with said housing and slidably mounted for vertical movement; a valve in the lower end of said filling tube; lever means actuable upon descent of said housing and filling tube adapted to open said valve; a return pipe having its lower opening terminating in a nozzle and its other end communicating with the liquid tank; an outlet valve in said return pipe, a spring for closing said outlet valve manually adjustable means on said frame comprising a movable vertical rod and a plurality of horizontally extending spaced apart arms thereon, said arms being actuable by said liquid housing and adapted to open said outlet valve.

2. In a barrel filling machine substantially of the class described having a vertically slidable frame adapted to be lowered to rest upon the barrel opening and having a slidably mounted liquid receiving head and filling tube, said filling tube adapted to be lowered into the barrel; a tortuous back pressure return tube adapted to form a communication from the barrel aperture to the tank; an observing glass in said return tube; a spring pressed valve in the lower portion of said back pressure return tube, a rod mounted for vertical and rotatable movement and connected to said valve; a plurality of arms on said rod adapted to be actuated by the liquid receiving head upon descent thereof to cause said valve to open, and means for maintaining said valve in closed position when said head and filling tube are in elevated position.

3. In an automatic barrel racking machine, a plurality of standards; a liquid cylinder; a mounting bracket having integral pivot studs extending from the ends thereof and in non-alignment with the longitudinal axis of said bracket; a cylinder mounted on said bracket; a system of air pipes communicating with said cylinder; a manually actuable valve for controlling air in said air pipe system and cylinder; a frame slidably mounted with respect to said bracket, the lower end of said frame terminating in a nozzle; a liquid receiving housing slidably mounted with respect to said slidable frame; a pipe connecting said housing and said tank; a filling tube having one end on said liquid receiving housing and slidably mounted in the lower end of said frame; a valve in the lower end of said filling tube; lever means automatically actuable to open said last-mentioned valve when said liquid housing and filling tube have been lowered; an irregular shaped liquid return housing communicating with said nozzles; a return pipe connecting its upper end and said tank; a spring pressed valve in said liquid return housing; a rotatable coupling at the upper end of the stem of said liquid return housing valve; a rod in said coupling and slidably mounted at its upper end, and spaced apart laterally projecting arms on said rod, the downward movement of said liquid receiving housing being adapted to contact one of said arms and press said slidably mounted rod downwardly to open said spring pressed return valve in said return housing.

4. In an automatic keg filling machine, a plurality of standards; a liquid reservoir having removable ends; a supporting bracket having opposed eccentric bearing studs formed integral therewith and in non-alignment with the central longitudinal axis of said bracket, said studs being pivotally secured with respect to said tank; a cylinder mounted on said bracket; a system of air pipes communicating with the ends of said cylinder; a piston slidable in said cylinder; a piston rod on said piston extending downwardly exteriorly of said cylinder; a swingable frame mounted on said bracket; a slidable frame on said swingable frame; a liquid receiving housing slidably mounted with respect to said slidable frame and movable vertically; an elongated filling tube communicating with said housing, said filling tube being slidably mounted for vertical movement in said nozzle; a valve in the lower end of said filling tube; lever means actuable upon descent of said housing and filling tube adapted to open said valve; means for adjusting said lever means; a liquid return pipe having its lower opening terminating in a nozzle and its other end communicating with the liquid tank; a back pressure valve slidably mounted in said return tube and having its stem extending upwardly and exteriorly of said tube; a rod slidably and rotatably mounted in substantial axial alignment with the stem of said back pressure valve and having a rotatable connection with said valve stem; and a plurality of horizontally extending spaced apart arms on said rod, the downward movement of said liquid receiving housing and filling tube being adapted to contact one of said arms to open said back pressure valve.

5. In a machine for filling liquid containers and having a pivotally mounted frame member, said pivotal connections being offset and to one side of the longitudinal central axis of said frame member and to the center of gravity of said frame member whereby the same will swing by gravity to inclined position when inoperative, and having an inner frame slidably mounted with respect to and in engagement with said first mentioned frame member, the lower cross member of said inner frame having a vertical passage terminating in an annular lip insertable into a barrel aperture to seal the same; a slidably mounted liquid receiving head; a filling tube having one end communicating with said head and slidable in said vertical passage; a valve in said filling tube; lever means for opening said valve and automatically actuable upon downward movement of said housing and tube; a valve housing on the lower cross member of said slidable frame and communicating with said cross member aperture; a back pressure valve in said valve housing; means for normally holding said valve in closed position; means for opening said valve and actuable by movement of said liquid receiving head comprising a vertically and rotatably mounted rod, said rod having one end coupled to said valve, a plurality of horizontally extending spaced apart arms on said rod, said liquid receiving housing, upon descent, being adapted to engage one of said arms to open said back pressure valve to permit air pressure to flow into a barrel, and a return pipe connecting said valve housing and the liquid tank.

6. In a machine for filling liquid containers and having a pivotally mounted frame member, said pivotal connections being offset and to one side of the center and longitudinal central axis of gravity of said frame member whereby the same will swing by gravity to inclined position when inoperative, and having an inner frame slidably mounted with respect to said first mentioned frame member, the lower cross member of said inner frame having a vertical passageway terminating in an annular lip; a slidably mounted liquid receiving head; a filling tube having one end communicating with said head and slidable in said vertical passage; a valve in said filling tube; lever means for opening said valve and actuable upon downward movement of said housing and tube; a valve housing on the cross member of said slidable frame and communicating with said cross member aperture; a back pressure valve in said valve housing; means for normally holding said valve in closed position; and means comprising a movable rod and arms thereon for maintaining said valve in open position and actuable by engagement of said liquid receiving head when moved.

PAUL H. KECK.